United States Patent [19]

Awai et al.

[11] Patent Number: 5,016,152
[45] Date of Patent: May 14, 1991

[54] FOCUSED LIGHT SOURCE AND METHOD

[75] Inventors: George K. Awai, Ikuwai, Hi.; Song S. Lee, San Jose, Calif.

[73] Assignee: Fiberstars, Inc., Fremont, Calif.

[21] Appl. No.: 410,860

[22] Filed: Sep. 21, 1989

[51] Int. Cl.$^5$ .............................. F21V 9/00
[52] U.S. Cl. ................... 362/293; 362/264; 362/310
[58] Field of Search ............... 362/32, 263, 264, 293, 362/307, 310, 347

[56] References Cited

U.S. PATENT DOCUMENTS 4,290,097 9/1981 Block et al. ...................... 362/264
4,386,292 5/1983 Rothwell et al. ............... 362/293 X
4,583,528 4/1986 Bauman ......................... 362/347 X
4,814,956 3/1989 Kano ............................. 362/293

Primary Examiner—Stephen F. Husar
Attorney, Agent, or Firm—A. C. Smith

[57] ABSTRACT

An improved light source for illuminating optical fibers includes a high-intensity gas-discharge lamp positioned within a reflector assembly that focuses radiation from the lamp onto a remote focal point, and that selectively transmits and reflects desired visible radiation and attenuates undesirable ultraviolet and infrared radiation. Alignment procedures in assembly process ensure maximization of flux intensity supplied to optical fibers positioned at the remote focal point of the reflector assembly.

9 Claims, 7 Drawing Sheets

FOCUSED LIGHT SOURCE AND METHOD

RELATED APPLICATIONS

The subject matter of this application relates to the subject matter of application Ser. No. 121,906, entitled "Cooled Lighting Apparatus and Method", filed on Nov. 17, 1987 by George K. Awai, now U.S. Pat. No. 4,825,341, and to the subject matter of application Ser. No 264,778, entitled "Cooled Lighting Apparatus and Method,", filed on Oct. 31, 1988, by George K. Awai, now U.S. Pat. No. 4,922,385.

BACKGROUND OF THE INVENTION

Field of the Invention

This invention relates to light sources particularly suitable for illuminating optical fibers, and more particularly to an assembly including arc-discharge lamp and reflector which efficiently transfers visible radiation and inhibits ultraviolet and infrared radiation between light source and fibers.

Numerous fiber-optic illumination applications require a light source that is capable of launching light flux into an optical fiber to propagate along the length of the fiber in low-order modes for long distance propagation, or in higher-order modes, for example, for lateral emission through the side surface of the fiber. Applications of the former type commonly use glass optical fibers, and applications of the latter type commonly use plastic optical fibers. For plastic optical fibers, care must be taken to minimize heat and ultraviolet radiation along with visible illumination because of the deleterious effect on plastic fiber materials of radiation at both ends of the spectrum around the visible spectrum. In addition, a light source for illuminating optical fibers ideally should supply all of the visible output flux to a focal point at which the end of an optical fiber is positioned for maximally efficient transfer of light flux into the optical fiber.

SUMMARY OF THE INVENTION

In accordance with the present invention, an improved light source structure and method of optimizing the transfer of visible light flux to optical fibers includes a high-intensity, gas-discharge lamp positioned within an ellipsoidal reflector with wave length-selective coatings for enhancing the transfer of visible light flux to a focal point, or small focal area, and to minimize the heat and ultraviolet flux supplied thereto from the lamp. The peculiarities of the radiation patterns of typical metal-vapor gas-discharge lamps are identified and utilized to increase the efficiency of transfer of visible light flux from the lamp into optical fibers.

DESCRIPTION OF THE ILLUSTRATED EMBODIMENT

Figure 1:
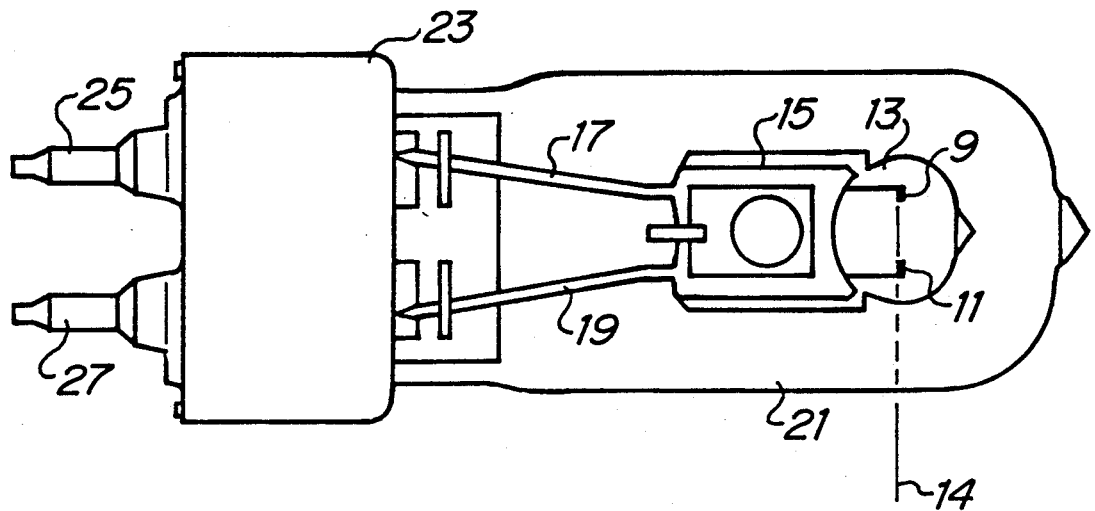
FIG. 1 is a plan view of a typical metal-vapor high-intensity gas-discharge lamp.

Referring now the FIG. 1, there is shown a plan view of a gas-discharge lamp that includes a bulb 13 including a pair of electrodes 9, 11 oriented in facing, mating alignment along an axis 14. The bulb 13 contains an ionizable gas (or gases) and the vapors of such metals as tin, thallium and mercury. Bulb 13 is formed of glass in a glass blank 15 that rigidly supports the electrodes 9, 11 and the lead-in conductors therefor 17, 19 in fixed location. The bulb 13 and blank 15 and lead-in conductors 17, 19 are housed within glass shell 21 that is attached to base 23 through which the lead-in conductors 17, 19 pass to form connector pins 25, 27. Lamps of this type are commercially available (for example, from OSRAM Corp. of Newburgh, New York), and are typically capable of emitting approximately 12,000 lumens at a color temperature of about 3000° K. with about 150 watts dissipation.

Figure 2:
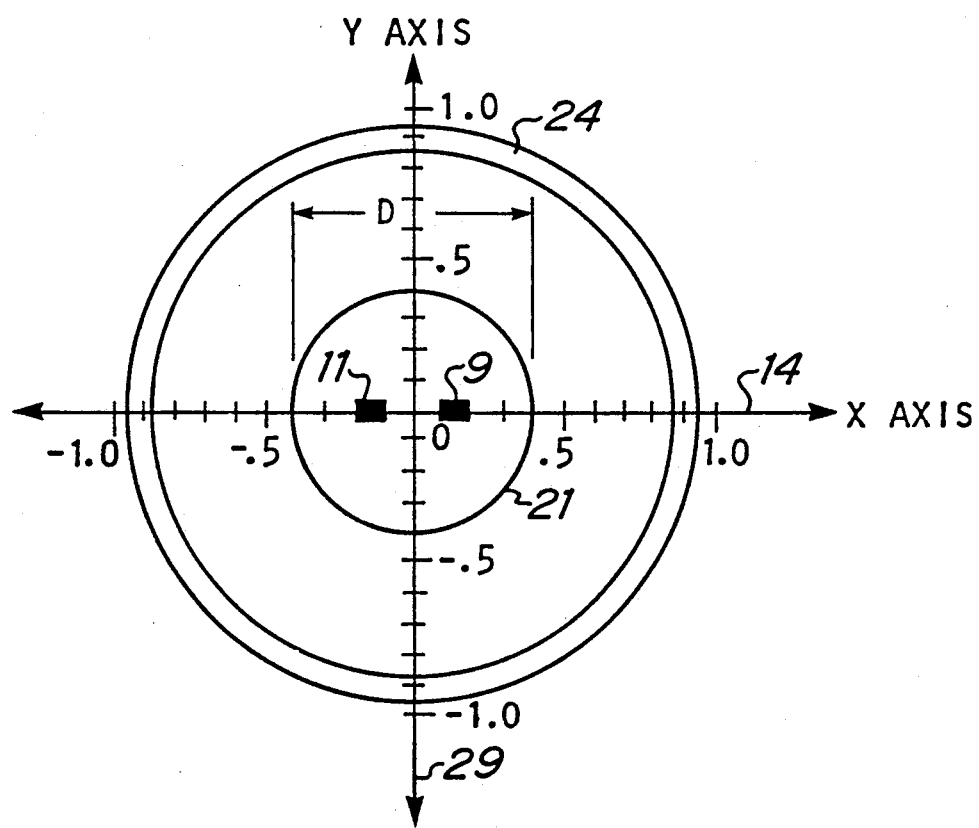
FIG. 2 is an end view of the lamp of FIG. 1.
Figure 7:
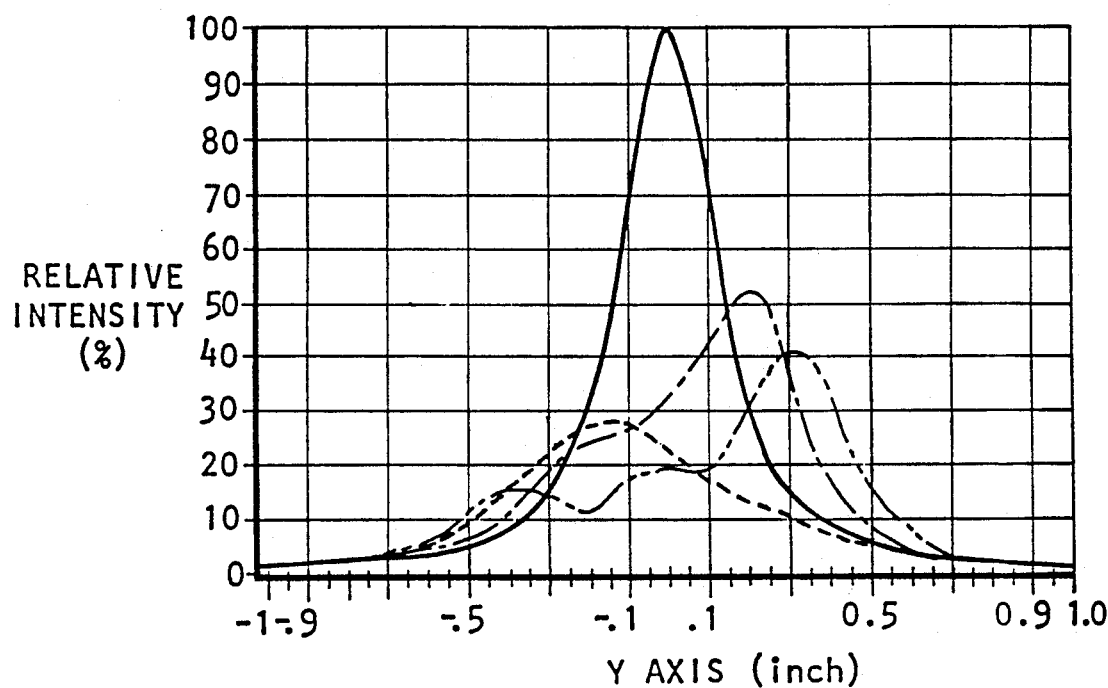
FIG. 7 is a graph showing a normalized plot of the luminous intensity in the vertical plane of the lamp of FIG. 1.
Figure 6:
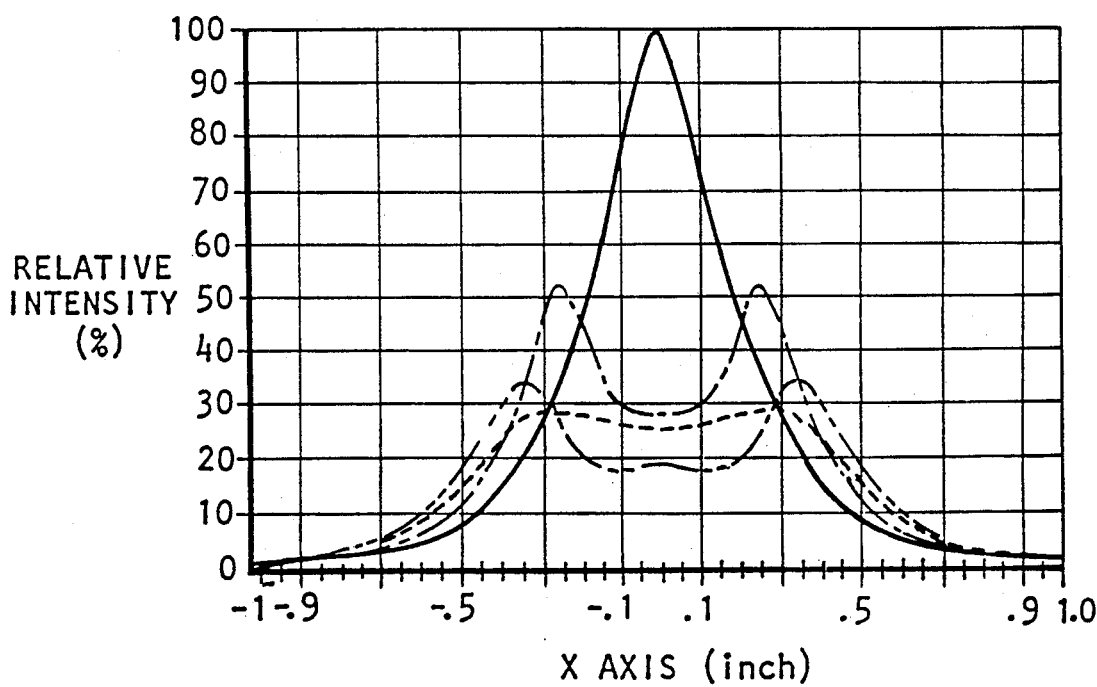
FIG. 6 is graph showing a normalized plot of the luminous intensity in the horizontal plane of the lamp of FIG. 1.

The lamp illustrated in FIG. 1 is illustrated in simplified end view in FIG. 2. The electrodes 9, 11 are aligned along axis 14 and are shown spaced about a vertical axis 29 that is normal to the (horizontal) axis 14 of alignment of the electrodes, with a reflector 24 substantially axially and symmetrically disposed about the lamp. The lamp is illustrated symmetrically oriented about the origin of the X (horizontal) and Y (vertical) axes 14, 29 for purposes of correlating the illumination intensity distribution data of the lamp, as illustrated in the graphs of FIGS. 6 and 7, later described herein.

Figure 3:
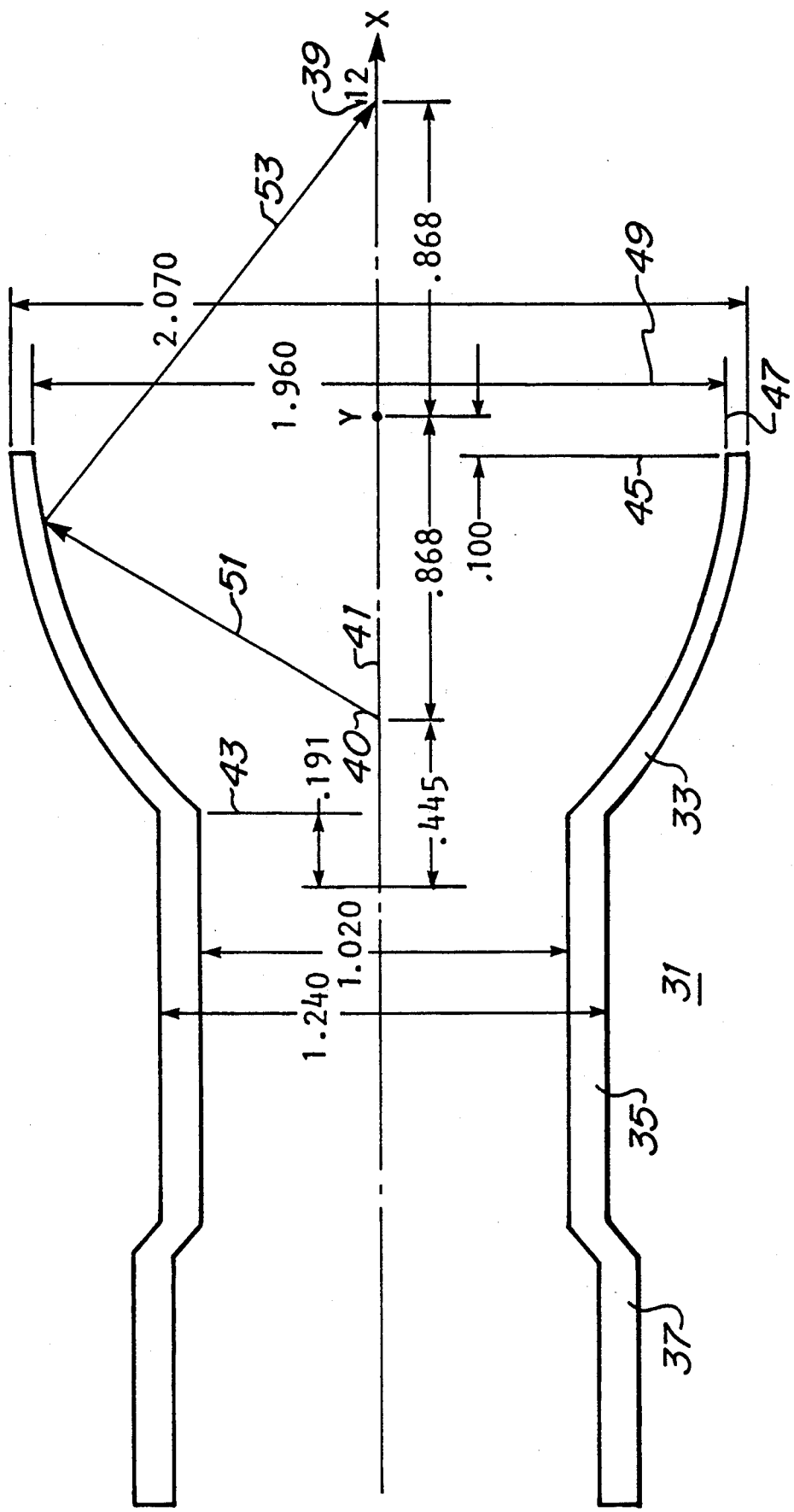
FIG. 3 is a sectional view of a reflector housing for the lamp of FIG. 1.

Referring now to FIG. 3, there is shown a sectional view of the reflector housing 31 according to the present invention for the lamp of FIG. 1. The reflector housing 31 includes a reflector section 33, an alignment section 35, and a mounting section 37. The alignment section 35 is formed with internal dimensions to receive the shell 21 of the lamp in close axial alignment, and the mounting section 37 is formed with internal dimensions to receive the base 23 for attaching the components together, in the manner as later described herein, with the electrode axis located at the focal point 40 of the reflector section 33.

Figure 4:
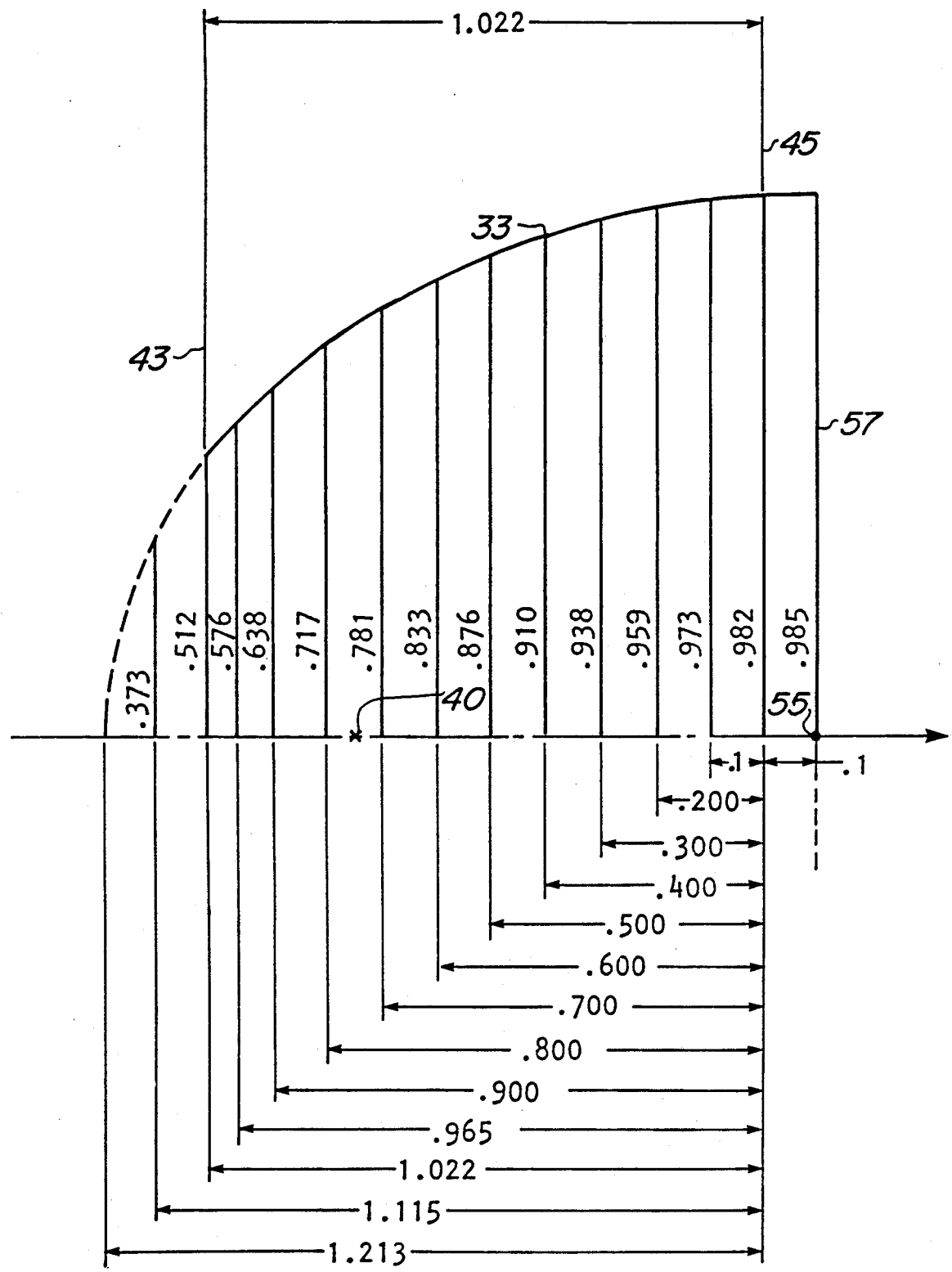
FIG. 4 is a graph illustrating the curvature of the reflector housing of FIGS. 3 and 5.

The reflector section 33 is designed to focus the light that is emitted from the 'filament' of a gas-discharge arc which is maintained between electrodes 9, 11 (by conventional external circuitry that forms no part of the Present invention) upon a point (or small focal area) 39 at which the end(s) of one or more optical fibers are to be located. The reflector section 33 is formed generally as a truncated, regular ellipsoidal shape of revolution about the origin axis 41, on which lay the foci 39 and 40 of the ellipsoidal shape. The truncations of the ellipsoid are in the plane 43 of intersection of the internal dimensions of the alignment section 35 and reflector section 33, and in the plane 45 near the normal to the horizontal tangent substantially at or near the maximum diameter 49. The ellipsoidally-shaped reflector section 33 may extend further than the location of plane 45 in the direction toward the focal point 39, in order to capture and reflect additional flux emitted from between the electrodes 9, 11, subject only to the limitations attendant to eliminating heat from within the assembly and to the desire to provide adequate clearance for the interpositioning of color filters between the bulb and the focal point 39. Therefore, with the electrodes 9, 11 oriented at one focal point 40 of the (truncated) ellipsoid, the radiant flux 51 emitted from therebetween is focused at the other focal point 39 in accordance with well-known physical principles. The specific shape of the ellipsoidal reflector section 33 between truncations 43 and 45 is illustrated in the graph of FIG. 4. As previously noted, the truncation plane 45 may be at or near the maximum diameter 57 of the ellipsoid (which is at origin 55 on the origin axis), and the focal point 40 is the location on the reflector section at which the electrodes 9, 11 of the lamp are positioned and aligned 14. The assembled reflector and lamp is illustrated in FIG. 5.

Figure 5:
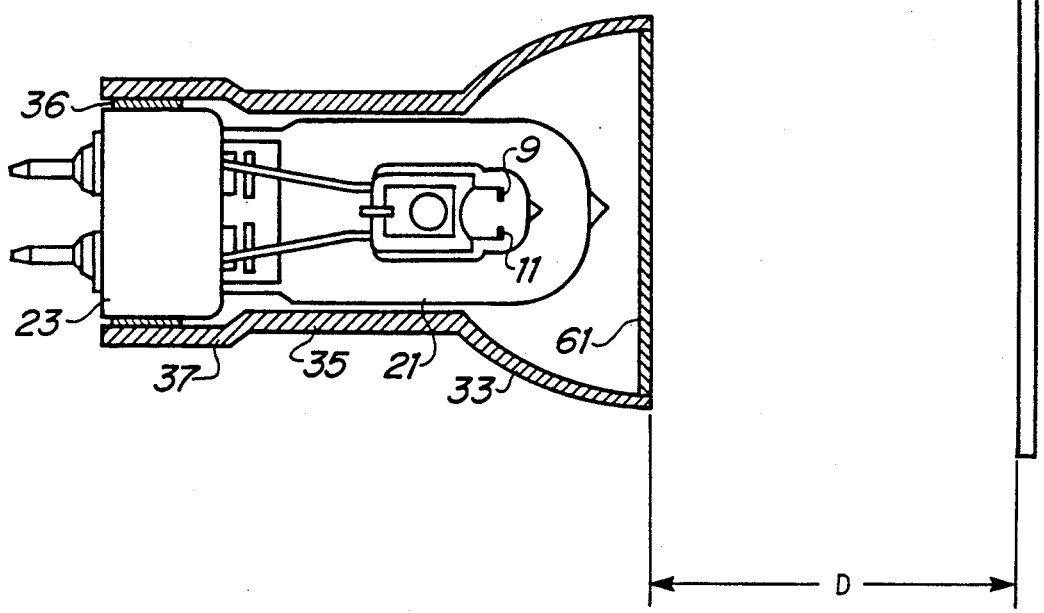
FIG. 5 is a sectional view of the light source according to the present invention.

In accordance with the present invention, the luminous intensity of the radiant flux emitted from between the electrode 9, 11 and focused at the focal point 39 is detected at point locations in a plane normal to the central axis and positioned at or near the focal point 39, as illustrated in FIG. 5. The plots of luminous intensity detected at such points in a plane that is positioned at various distances from the electrodes 9, 11 are illustrated in the graphs of FIGS. 6 and 7. Specifically, FIG. 6 illustrates the luminous intensity at points in the horizontal plane which intersects the electrodes 9, 11 at various distances therefrom, and FIG. 7 illustrates luminous intensity or points in the vertical plane intermediate the electrodes 9, 11 at various distances therefrom. It should be noted that the distribution of luminous intensities is centrally peaked at the focal distance, and that the distribution is substantially symmetrical in the horizontal plane (as illustrated in FIG. 6). However, the intensity distribution is asymmetrical in the vertical plane (as illustrated in FIG. 7) with the supplemental peaks of luminous intensities peaking at locations above the horizontal plane that intersect the electrodes 9, 11 where the detecting distance, d, of FIG. 5 is less than or equal to the focal distance (about 1.0").

Applicant believes that one explanation for asymmetrical intensity distribution is that ionizable gases within bulb 13 including metal-vapors tend to condense and pool dominantly in the lower region of the bulb 13 to varying degrees with increased operating time. Thus, radiant flux emitted from the lower portion of the bulb 13 is thereby partly attenuated or occluded. Because of this effect on the total flux radiated from between the electrodes 9, 11, the axis of electrodes 9, 11 is displaced slightly in the negative or downward direction relative to the axis of symmetry of the reflective section 33 to slightly shift the peak in the vertical distribution. Therefore, in assembling the shell 21 of the lamp and the base 23 within the axial section 35 and mounting section 37, respectively, the electrode axis 14 is displaced below the axis of symmetry of the reflector section 33 by a selected dimension, and the base 23 is then attached or permanently affixed to the mounting section 37, for example, using a glass-to-glass weld, or conventional epoxy or frit-glass adhesives 36, or the like. The selected displacement dimension is believed to be dependent upon the diameter, D, of gas filled bulb 13 illustrated in FIG. 2. Therefore, the displacement of the electrodes 9, 11 relative to the axis of symmetry is set at about $n \times D$, where $0 \leq n \leq 0.2$. The total flux intensity detected at the focal point 39 is thus maximized, and the base 23 and mounting section 37 are rigidly and permanently attached together to provide the lamp assembly, as illustrated in FIG. 5, that retains a preferred operating orientation (i.e., with electrode axis 14 horizontal) for providing maximum flux intensity at the focal point 39 (at which the ends of optical fibers are positioned). The attachment of the base 23 to the mounting section 37 of the reflector greatly facilitates differential thermal expansions at the cooler remote ends of the lamp and reflector that are removed from the source of heat in the region of the ionized discharge between electrodes 9, 11.

Figure 8A:
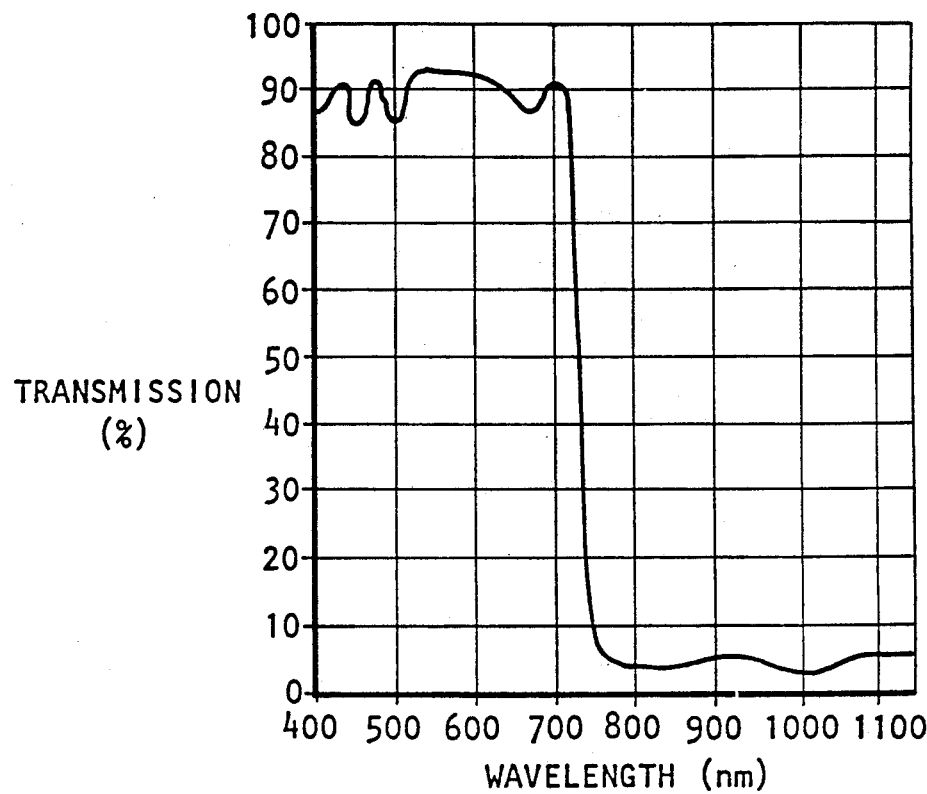
FIG. 8A, 8B and 8C are graphs illustrating the idealized transmission characteristics of filter coatings on the assembly of FIG. 5.
Figure 8C:
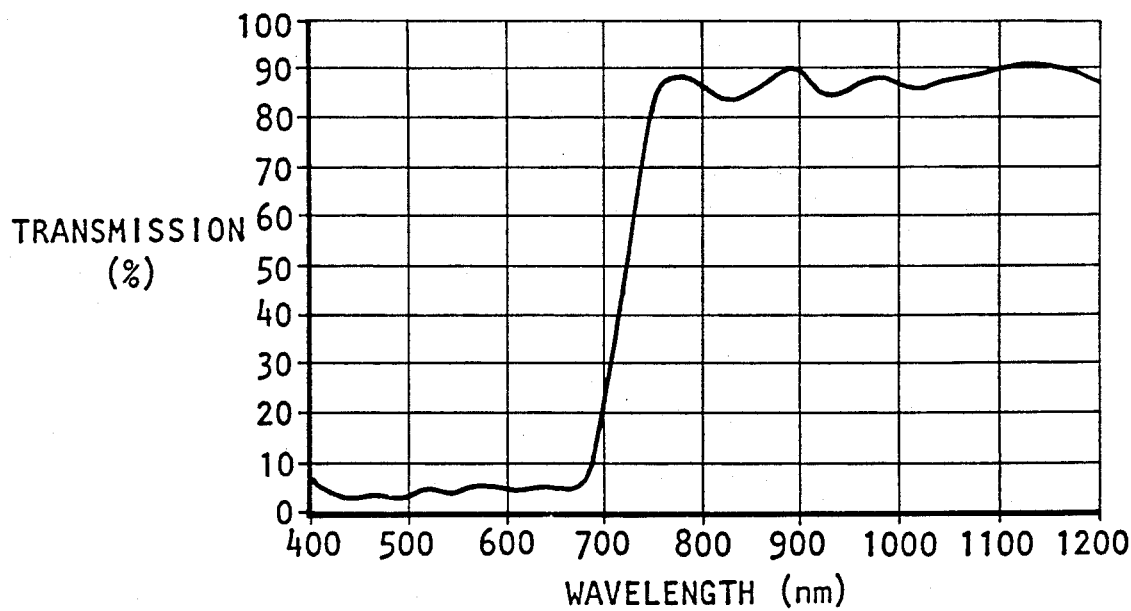
Figure 8B:
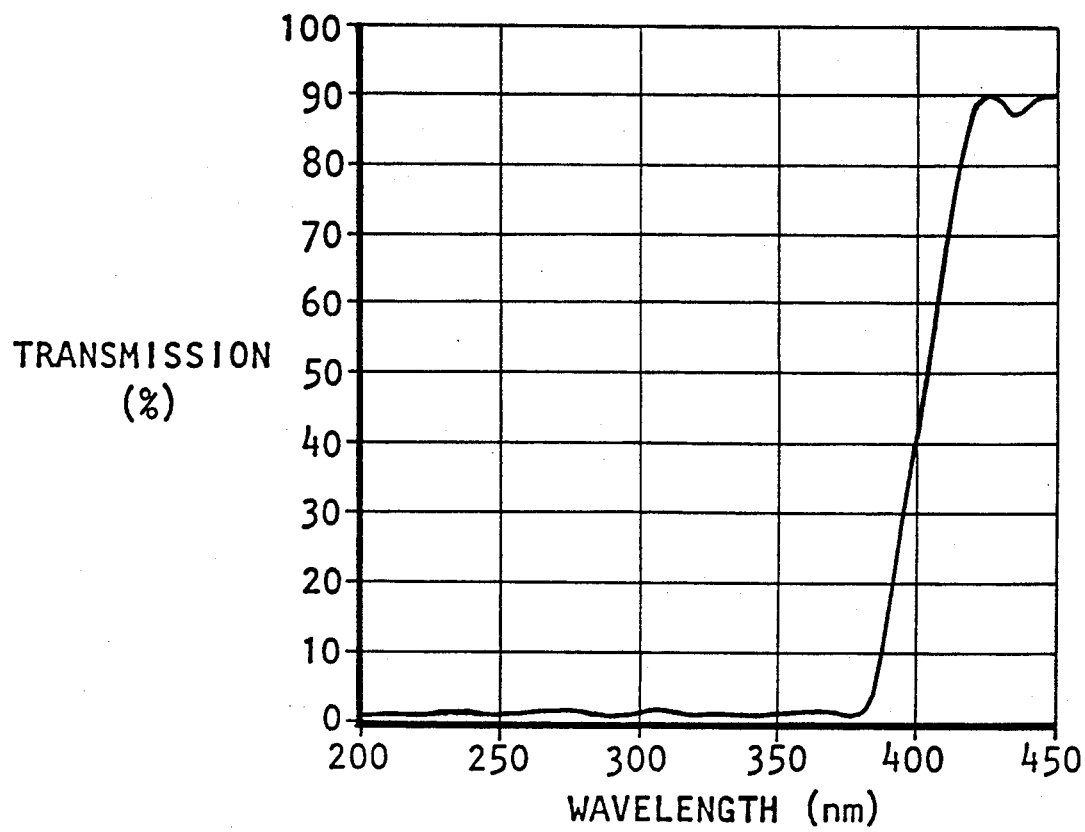

In accordance with another aspect of the present invention, dichroic filters are formed on a transparent glass face plate 61 that is attached to the outer truncation of the reflector section 33, as illustrated in FIG. 5, as well as on the inner surfaces of the reflector section 33. Dichroic filters are formed in conventional manner (for example, using metal vapor deposition techniques) on these surfaces to provide wavelength-selective transmission through the face plate 61, as illustrated in FIG. 8A, and to provide wavelength-selective reflection from the surfaces of the reflector section 33. Resultant emitted radiation from the assembly of FIG. 5 is therefore enhanced in the visible range and substantially attenuated in the infrared and ultraviolet ranges, as illustrated in FIG. 8A. Specifically, the transmission characteristics of the dichroic filter coating on the faceplate 61 cut off or inhibits the transmission of wavelengths in the infrared and ultraviolet ranges, as illustrated in FIG. 8A and 8B. Also, the transmission characteristics of the dichroic filter coating on the reflector section 33 transmits (i.e., does not reflect) the wavelengths in the infrared range, as show in FIG. 8C.

The resultant radiation received by optical fibers positioned at the focal point 39 of the light source of the present invention is therefore significantly less deleterious to the plastic materials of optical fibers due to diminished heat and ultraviolet radiation from the light source of the present invention.

Therefore, the light source of the present invention is ideally suited for illuminating the ends of optical fibers positioned at or near the focal point of a truncated ellipsoid. In addition, the intensity of visible radiation supplied to such focal point is maximized via the alignment procedure previously described, and the intensity of undesirable radiation is attenuated by forming dichroic filters or radiation reflective and transmissive components in the assembly.

What is claimed is:
1. Lighting apparatus comprising:
a lamp including a filamentary source therein of radiation within a determined waveband, said source being oriented along an axis that is substantially normal to a reference axis that is aligned with a selected direction of illumination;
reflector means disposed about the lamp for concentrating radiation therefrom near a point substantially along the reference axis and remote from the source, said reflector means including substantially an ellipsoid of revolution substantially about the reference axis with said point and another point near said source as the foci of the ellipsoid and being truncated substantially in a plane normal to the reference axis at a location therealong approximately equidistant between the location of said source and said point; and
a face plate of radiation transmissive material disposed at the truncation of the reflector means for transmitting therethrough the radiation originating from said source.

2. Lighting apparatus as in claim 1 wherein said lamp includes a pair of electrodes spaced apart therein along said axis and including an ionizable gas therein for supporting a filamentary discharge therebetween in response to electrical signal supplied thereto.

3. Lighting apparatus as in claim 2 wherein said lamp includes metal vapor therein; and said axis of the electrodes is displaced from the plane of the reference axis near said another point.

4. Lighting apparatus as in claim 3 wherein said axis of the electrodes is displaced from said reference axis.

5. Lighting apparatus as in claim 1 including filter means on said face plate for attenuating the transmission therethrough of radiation from the source that is substantially outside the waveband of visible light.

6. Lighting apparatus as in claim 1 including filter means on said reflector means for diminishing the reflectivity thereof of radiation from the source that is substantially outside the waveband of visible light.

7. Lighting apparatus as in claim 4 wherein said electrodes are oriented to operate with the axis thereof substantially horizontal and said axis of the electrodes is substantially at or displaced below said reference axis.

8. Lighting apparatus as in claim 1 wherein said lamp includes a supporting base attached to and positioned a distance away from said filamentary source;

said reflector means includes a housing integrally formed therewith to form a channel therein from the reflector means to a remote end of the housing; and comprising:

attachment means disposed between said supporting base and the remote end of said housing for forming an assembly that maintains the lamp within the reflector means and housing with the filamentary source positioned substantially about said another point.

9. Lighting apparatus as in claim 8 wherein said reflector means includes a reflector section near said filamentary source that is approximately 1.0 inch long and approximately 2.0 inches in diameter in said truncated plane, and approximately 1.0 inch in diameter at a plane of truncation of the ellipsoid at a location on a side of said another point which is remote from said point.

* * * * *